(12) United States Patent
Colvin et al.

(10) Patent No.: US 9,091,145 B2
(45) Date of Patent: Jul. 28, 2015

(54) SYSTEMS AND METHODS FOR OPTIMAL POSITIONING OF DRILLING PADS

(75) Inventors: Richard Daniel Colvin, Dripping Springs, TX (US); Olivier Roger Germain, Houston, TX (US); DeWayne Pratt, Littleton, CO (US); Philip William Woodard, Adelaide (AU)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 14/389,729

(22) PCT Filed: May 31, 2012

(86) PCT No.: PCT/US2012/040107
§ 371 (c)(1),
(2), (4) Date: Sep. 30, 2014

(87) PCT Pub. No.: WO2013/180713
PCT Pub. Date: Dec. 5, 2013

(65) Prior Publication Data
US 2015/0060060 A1 Mar. 5, 2015

(51) Int. Cl.
*E21B 47/00* (2012.01)
*E21B 15/00* (2006.01)
*E21B 41/00* (2006.01)
*E21B 43/30* (2006.01)
*E21B 7/00* (2006.01)

(52) U.S. Cl.
CPC ........... *E21B 41/0092* (2013.01); *E21B 7/00* (2013.01); *E21B 43/30* (2013.01); *E21B 43/305* (2013.01); *E21B 15/003* (2013.01); *E21B 47/00* (2013.01)

(58) Field of Classification Search
CPC ......... E21B 15/003; E21B 47/12; E21B 7/02; E21B 43/30; E21B 15/00; E21B 47/00; E21B 41/0092
See application file for complete search history.

(56) References Cited

U.S. PATENT DOCUMENTS

| 6,549,879 | B1 * | 4/2003 | Cullick et al. | 703/10 |
| 2009/0056935 | A1 * | 3/2009 | Prange et al. | 166/245 |
| 2009/0150097 | A1 * | 6/2009 | Camilleri | 702/45 |

OTHER PUBLICATIONS

Bates, Zakiya W., International Preliminary Report on Patentability, PCT/US12/40107, Apr. 24, 2014, 4 pages, ISA/US.

* cited by examiner

*Primary Examiner* — Zakiya W Bates
(74) *Attorney, Agent, or Firm* — Crain, Caton & James; John Wustenberg

(57) ABSTRACT

Systems and methods for optimal positioning of drilling pads for horizontal well field development considering the location and spacing of each horizontal well, boundaries and surface/subsurface hazards.

20 Claims, 6 Drawing Sheets

SYSTEMS AND METHODS FOR OPTIMAL POSITIONING OF DRILLING PADS

CROSS-REFERENCE TO RELATED APPLICATIONS

This application and U.S. Pat. No. 8,073,664, which is incorporated herein by reference, are commonly assigned to Landmark Graphics Corporation. This application claims the priority of PCT Patent Application No. PCT/US12/40107, filed on May 31, 2012, which is incorporated herein by reference.

STATEMENT REGARDING FEDERALLY SPONSORED RESEARCH

Not applicable.

FIELD OF THE INVENTION

The present invention generally relates to systems and methods for positioning drilling pads. More particularly, the present invention relates to the optimal positioning of drilling pads, sometimes referred to as platforms, for horizontal well field development considering the location and spacing of each horizontal well, the boundaries and surface/subsurface hazards.

BACKGROUND OF THE INVENTION

More than any other type of well, horizontal wells, sometimes referred to as laterals, need to be planned at the reservoir level with knowledge of where the drilling pad will be located. Likewise, the location and spacing of the horizontal wells must be taken into account when planning the positions of these drilling pads. In addition to the well positions, spacing, length and the like, boundaries and hazards must also be taken into account when positioning the drilling pads. Hazards can come in the form of subsurface hazards such as faults or shallow gas, or surface hazards such as roads, buildings, bodies of water, pipelines, railroads, environmentally sensitive areas and the like. In addition to surface hazards, the terrain itself is not always conducive to drilling. It might be too high, or contain too much slope so that the site preparation becomes too expensive.

As horizontal well field development has expanded over the last several years, it has been discovered that horizontal well targeting algorithms work much better if the laterals are positioned based upon existing pad locations. And, the pad locations produce better laterals if they are spaced appropriately based upon the laterals for which they are intended. Because of this interrelationship, techniques designed to do a throw away targeting of laterals, spot locations based upon those laterals, delete the laterals and redo the targeting based upon those computed locations produce decent results in simple areas but less effective results in regions where the terrain places severe restrictions on where drilling pads may be located. In order to address the less effective results, techniques have been employed where lots of pad locations are identified in areas where the terrain allows, then an optimal subset of those pad locations is determined. Although this technique has produced decent results, they are not optimal results wherein the pad location locations are evenly distributed over the entire field.

Attempts have also been made to use targeting algorithms for standard injector/producer patterns, such as line drive, to generate patterns that can be exported and reimported as platform locations, however, have been found to be less than optimal because the targeting algorithms are intended to create patterns that fill the boundaries with the maximum number of targets, whereas with drilling pads, maximum coverage with the fewest pad locations is desired.

Other conventional approaches have been patented such as the technique described in U.S. Pat. No. 7,200,540, which discloses an automated method for generation of platform locations and includes computing a maximum number of targets to be assigned to each respective user specified platform, selecting a possible set of platforms, validating the set of possible locations by comparing against exclusionary polygons and determining the best set of platform locations. Another patented technique is described in U.S. Pat. No. 6,549,879, which discloses a method for automated positioning of pad locations for drilling wells in a two stage method, wherein the drilling pads are positioned assuming wells can be only vertical and are then examined for optimized horizontal and deviated completions. Although these patented and unpatented techniques may produce acceptable results, they may be less than optimal for positioning drilling pads in consideration of the location and spacing of each horizontal well, the boundaries and surface/subsurface hazards.

SUMMARY OF THE INVENTION

The present invention therefore, meets the above needs and overcomes one or more deficiencies in the prior art by optimally positioning drilling pads for horizontal well field development considering the location and spacing of each horizontal well, the boundaries and surface/subsurface hazards.

In one embodiment, the present invention includes a method for positioning multiple drilling pads within a predetermined boundary, which comprises: a) determining a maximum number of rows based on a row spacing and a maximum distance; b) determining a maximum number of columns based on a column spacing and the maximum distance; c) determining a seed point location within the predetermined boundary for each row at a starting position and for each column at a starting position, each seed point location belonging to a set of seed point locations; d) computing a total value for the set of seed point locations using a computer processor; e) adjusting the starting position in each row by a row increment and the starting position in each column by a column increment; f) repeating steps c)-e) for a predetermined number of starting positions in each row and a predetermined number of starting positions in each column; and g) positioning a drilling pad at each location based on a respective seed point location within the set of seed point locations having a best total value.

In another embodiment, the present invention includes a program carrier device for carrying computer executable instructions for positioning multiple drilling pads within a predetermined boundary, the instructions being executable to implement: a) determining a maximum number of rows based on a row spacing and a maximum distance; b) determining a maximum number of columns based on a column spacing and the maximum distance; c) determining a seed point location within the predetermined boundary for each row at a starting position and for each column at a starting position, each seed point location belonging to a set of seed point locations; d) computing a total value for the set of seed point locations; e) adjusting the starting position in each row by a row increment and the starting position in each column by a column increment; f) repeating steps c)-e) for a predetermined number of starting positions in each row and a predetermined number of starting positions in each column; and g) positioning a drilling pad at each location based on a respective seed point location within the set of seed point locations having a best total value.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The present invention may be used to produce a set of pad sites, also referred to as pad locations, from a particular development scenario in an optimal manner given the location and spacing of each horizontal well, the boundaries and surface/subsurface hazards. For purposes of the following description, a pad location represents somewhere that a pad might be placed or positioned in an optimal manner, a point is a more generic position with x, y coordinates and a seed point is a point from which other points may be computed. For any seed point, given the desired well spacing distances and lateral lengths, a set of optimal pad locations may be computed with respect to each other, although they may not be optimal in terms of the boundaries and hazards. For each of the computed pad locations, it may also be possible to determine if the pad location is in a hazard area and if it is, walk it around using techniques well known in the art until either an acceptable "go area" is found or it has been moved too far to fit within the pattern as defined by a maximum movement distance. In the latter case, the pad location may be dropped from the pattern of pad locations. Each pad location can then be valued based on how much of its lateral footprint is within the allowed production boundaries compared to how much it had to be moved to get into a non-hazard area.

The overall pattern of pad locations may be valued based upon the sum of the pad location values. By trying various seed points, sets of pad locations may be produced with values that can then be compared. While the set of all possible seed points may be infinite, for all practical purposes the set from one location row spacing in the row direction and column spacing in the column direction may cover all possibilities. The largest variable may be the increment used in stepping through the rectangle of possible seed points. While the following description of the present invention may be particularly beneficial in large-scale developments of pad locations, with lots of hazards, it may also be used in more simple cases as well.

Method Description

Figure 1:
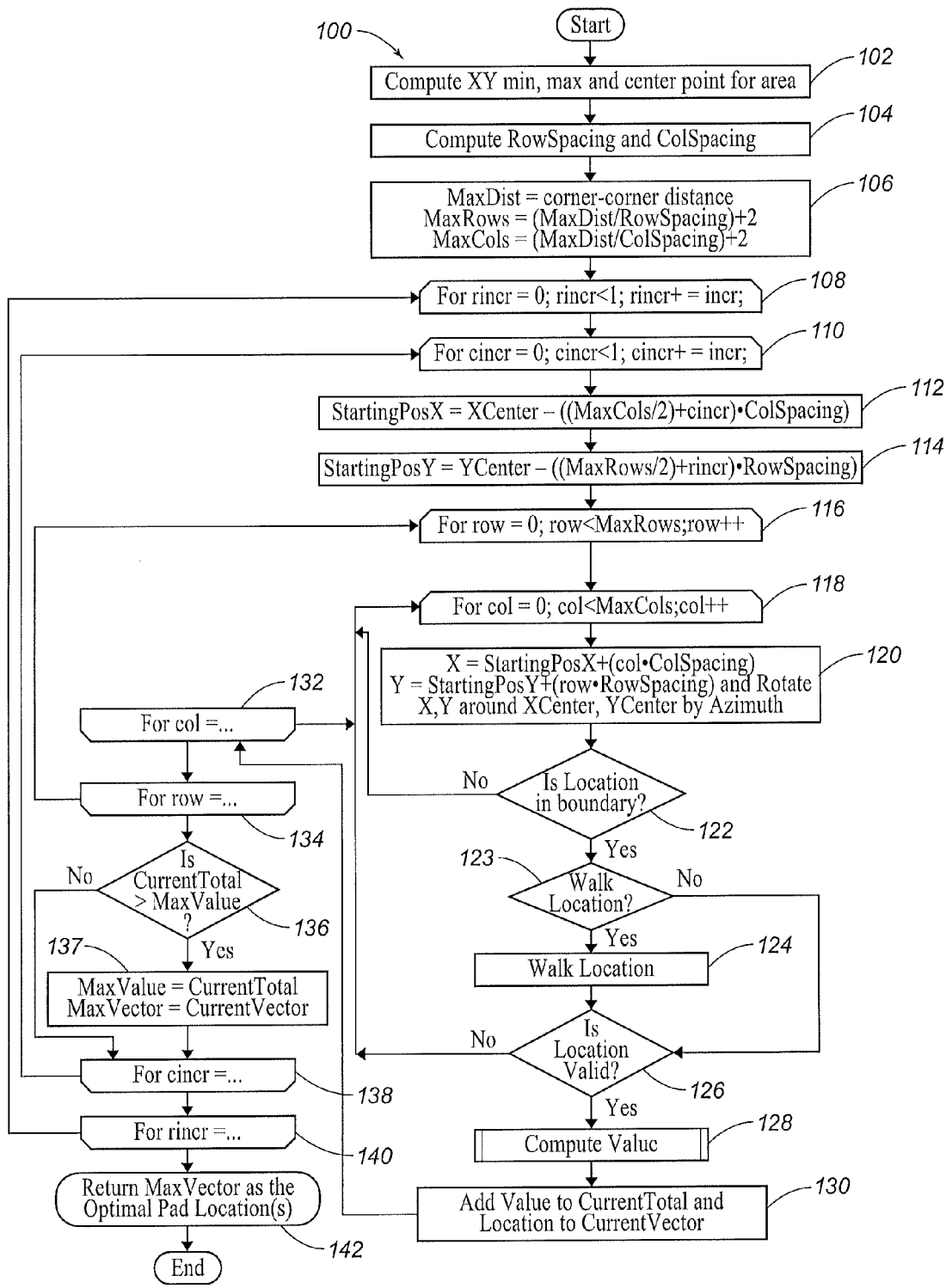
FIG. 1 is a flow diagram illustrating one embodiment of a method for implementing the present invention.

Referring now to FIG. 1, a flow diagram of one embodiment of a method 100 for implementing the present invention is illustrated. The method 100 generally produces a set of pad locations that are more or less in rows and columns.

Figure 4:
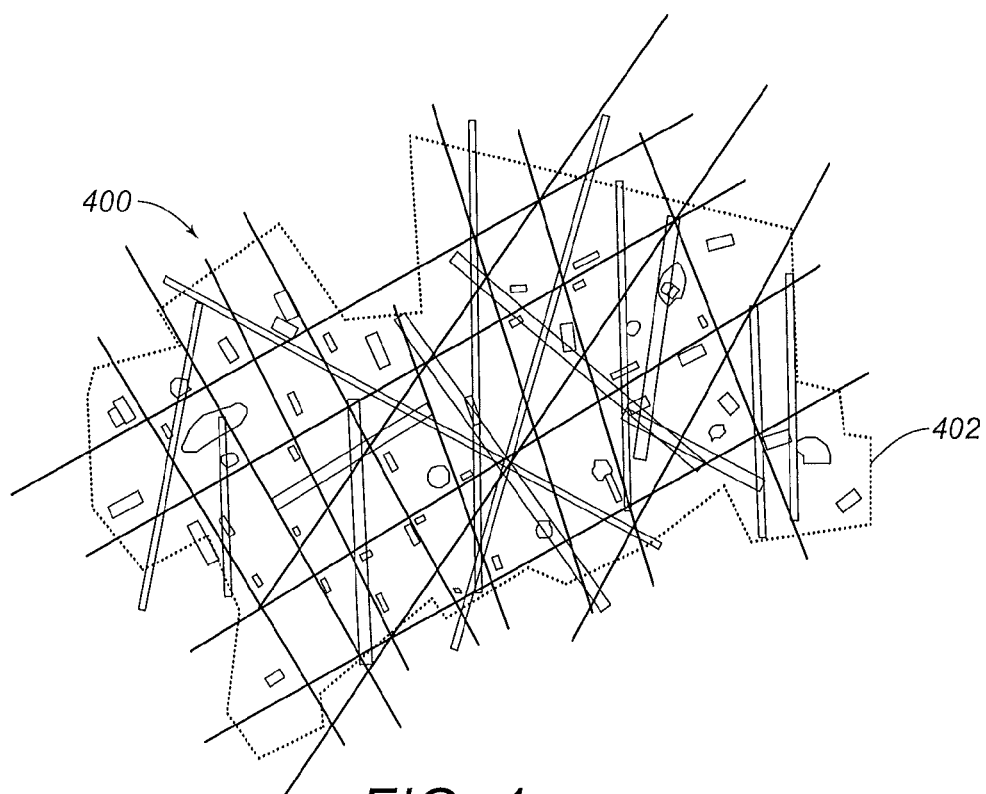
FIG. 4 is a plan view illustrating a predetermined area for field development with horizontal wells that includes numerous hazards of different sizes and shapes representing roads, pipelines and buildings.

In step 102, an X Y min, max and a center point are computed for a predetermined area representing the anticipated production field using techniques well known in the art. The computed values for (XMin–XMax, YMin–YMax) represent a range that may be used to determine the center point ("XCenter", "YCenter") for the predetermined area by ((XMin+XMax)÷2,(YMin+YMax)÷2)). The range and center point represent the extents of the predetermined area within which all possible pad locations must fall. In FIG. 4, a plan view 400 of a predetermined area for field development with horizontal wells is illustrated. Within a boundary 402 lies the predetermined area and numerous hazards of different sizes and shapes representing roads, pipelines and/or buildings. This step therefore, computes the range (XMin–XMax, YMin–YMax) and center point (XCenter, YCenter) within which all possible pad locations must fall within the predetermined area.

In step 104, a row spacing ("RowSpacing") and column spacing ("ColSpacing") are computed using techniques well known in the art, well dimensions and spacing values. For example, RowSpacing may be computed as the heel/heel spacing plus the toe/toe spacing plus two times the maximum lateral length. ColSpacing may be computed as two times the perpendicular reach to the heel. Alternatively, a user might wish to define their own row and column spacings.

In step 106, a maximum distance ("MaxDist"), a maximum number of rows (MaxRows) and a maximum number of columns ("MaxCols") are set equal to: i) corner-corner distance; ii) MaxDist/RowSpacing)+2; and iii) (MaxDist/ColSpacing)+2, respectively. Corner to corner distance is the distance between the points (XMin, YMin) and (XMax, YMax).

In step 108, a row increment ("rincr") is set to increase between 0 and 1 by a fixed predetermined increment such as, for example, 0.2.

In step 110, a column increment ("cincr") is set to increase between 0 and 1 by a fixed predetermined increment such as, for example, 0.2. The loops represented by steps 108, 140 and 110, 138 are therefore, used to rotate the seed point position (X, Y after rotation in step 120) around XCenter, YCenter in an attempt to find an optimal seed point position.

In step 112, a starting position X ("StartingPosX") is set equal to XCenter−((MaxCols/2)+cincr)·ColSpacing).

In step 114, a starting position Y ("StartingPosY") is set equal to YCenter−((MaxRows/2)+rincr)·RowSpacing).

In step 116, a row is set to increase by 1 between 0 and MaxRows.

In step 118, a column ("col") is set to increase by 1 between 0 and MaxCols. The loops represented by steps 116, 134 and 118, 132 are therefore, used to iterate through the number of rows and columns with a pad location being found, if possible, at each row, column location.

In step 120, X is set equal to StartingPosX+(col·ColSpacing), Y is set equal to StartingPosY+row·RowSpacing, and X, Y are rotated around XCenter, YCenter by Azimuth. Azimuth represents a predetermined primary drilling azimuth, which is used to rotate X, Y around XCenter, YCenter to a position represented as a new "Location."

In step 122 the method 100 determines if the Location is within a predetermined boundary, which may be represented as a surface boundary including any setbacks. If the Location is not within the predetermined boundary, then the method 100 returns to step 118. If the Location is within the predetermined boundary, then the method 100 proceeds to step 123.

In step 123, the method 100 determines whether to walk the Location based upon whether there are any hazards to avoid such as, for example, predetermined surface and subsurface hazards. If there are no hazards to avoid, then the method 100 proceeds to step 126. If there are hazards to avoid, then the method 100 proceeds to step 124 to walk the Location.

In step 124, the Location is walked using techniques well known in the art such as, for example, the "walk around" techniques described in U.S. Pat. No. 7,200,540. In this manner, a new location may be determined after walking is performed to avoid the hazard(s) or a null location is determined if walking is unable to find a new location within a predetermined maximum allowable movement distance. The more hazards encountered, particularly smaller hazards like roads, pipelines, buildings and the like, the more valuable the walk around becomes.

In step 126, the method 100 determines if the Location from step 120 or step 124 is valid using techniques well known in the art. For example, a valid Location may be one that is both within the predetermined boundary and free of hazards. A valid Location based upon this criteria therefore, may be determined by comparing the Location to one or more two-dimensional polygons, comparing them by color, to a geo-referenced image with known good/bad coloring, determining value and/or slope from a grid, etc. If the Location is not valid, then the method 100 proceeds to step 118. If the Location from step 124 is null, then the Location is invalid for purposes of this step. If the Location is valid, then the method 100 proceeds to step 128.

Figure 3:
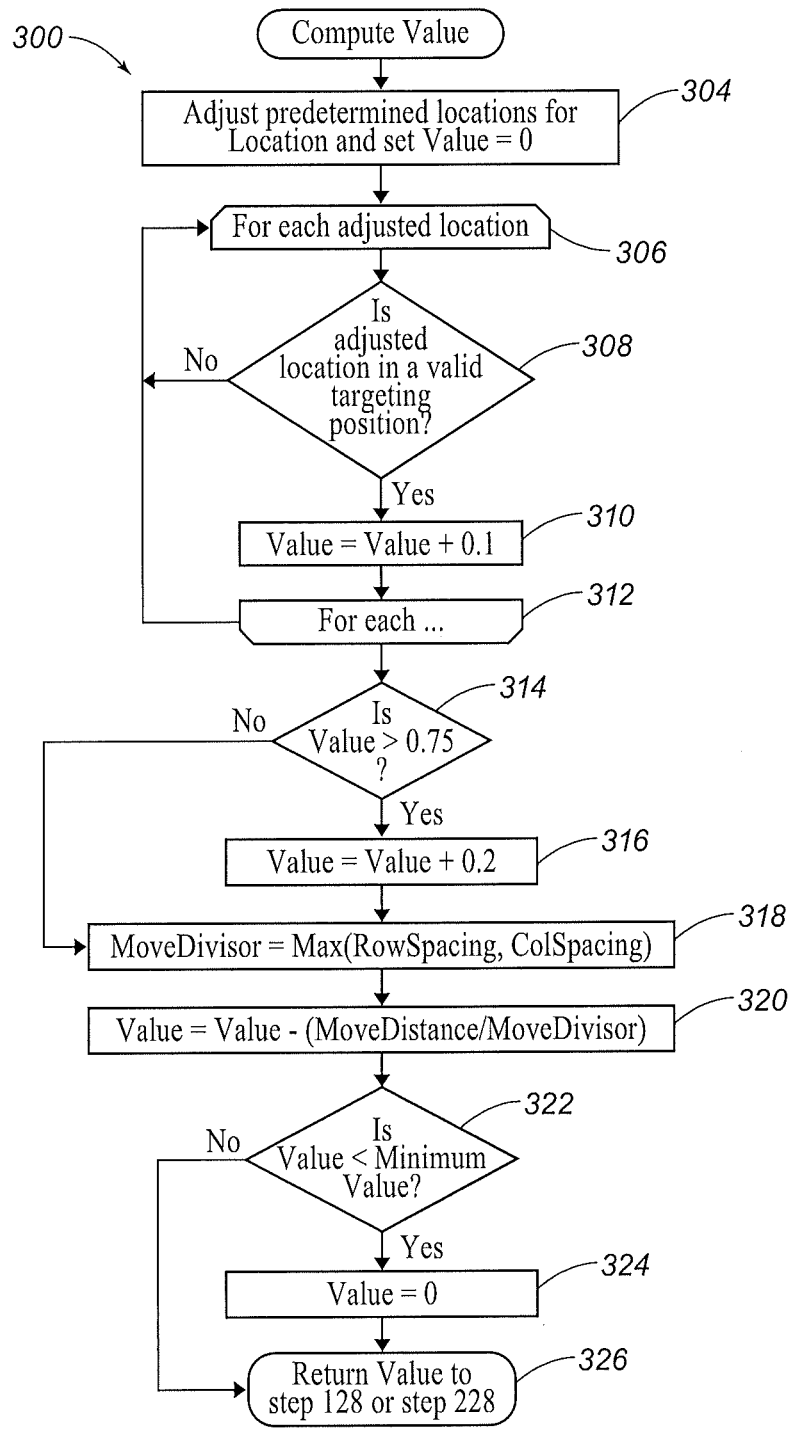
FIG. 3 is a flow diagram illustrating one embodiment of an algorithm for performing steps 128 and 228 in FIGS. 1 and 2, respectively.

In step 128, the "Compute Value" algorithm is executed to compute a Value, which is described further in reference to FIG. 3.

In step 130, the Value is added to a Current Total and the Location from step 120 or step 124 is added to a Current Vector. Current Vector is a running list of the Locations found in the current iteration of step 130. The CurrentTotal is a running total of the Values for the Locations in the list.

In step 132, the method 100 returns to step 118 if col is less than MaxCols and col is set to the next increment. If col is equal to MaxCols, then the method 100 proceeds to step 134.

In step 134, the method 100 returns to step 116 if row is less than MaxRows and row is set to the next increment. If row is equal to MaxRows, then the method 100 proceeds to step 136.

In step 136, the method 100 determines if the CurrentTotal is greater than MaxValue, which is 0 in the first iteration of step 136. If the CurrentTotal is not greater than MaxValue, then the method 100 proceeds to step 138. If the CurrentTotal is greater than MaxValue, then the method 100 proceeds to step 137.

In step 137, MaxValue is set to equal CurrentTotal and MaxVector is set to equal CurrentVector. And, thus, MaxVector represents the best set of pad locations found so far and MaxValue represents the cumulative Values of those pad locations.

In step 138, the method 100 returns to step 110 if cincr is less than 1 and cincr is set to the next increment. If cincr is equal to 1, then the method 100 proceeds to step 140.

In step 140, the method 100 returns to step 108 if rincr is less than 1 and rincr is set to the next increment. If rincr is equal to 1, then the method 100 proceeds to step 142.

In step 142, MaxVector is returned as the optimal pad location(s) and the method 100 ends.

Figure 5:
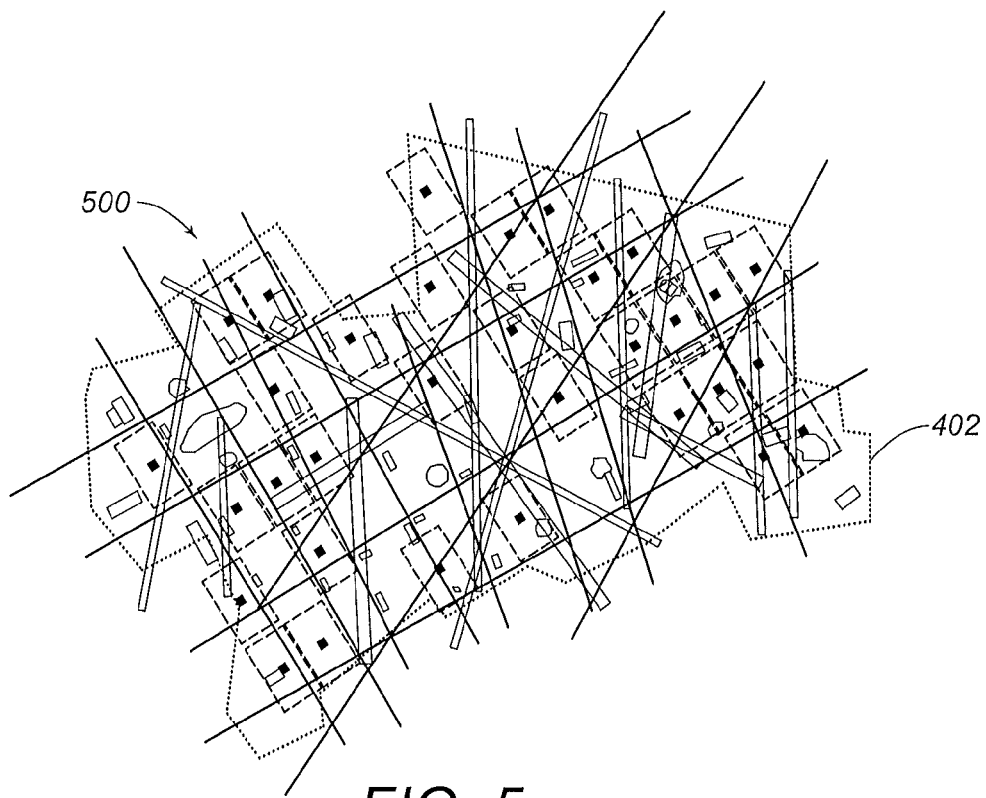
FIG. 5. is a plan view illustrating the predetermined area in FIG. 4 with the same hazards and a row by column pad location pattern based upon a single random seed point.
Figure 6:
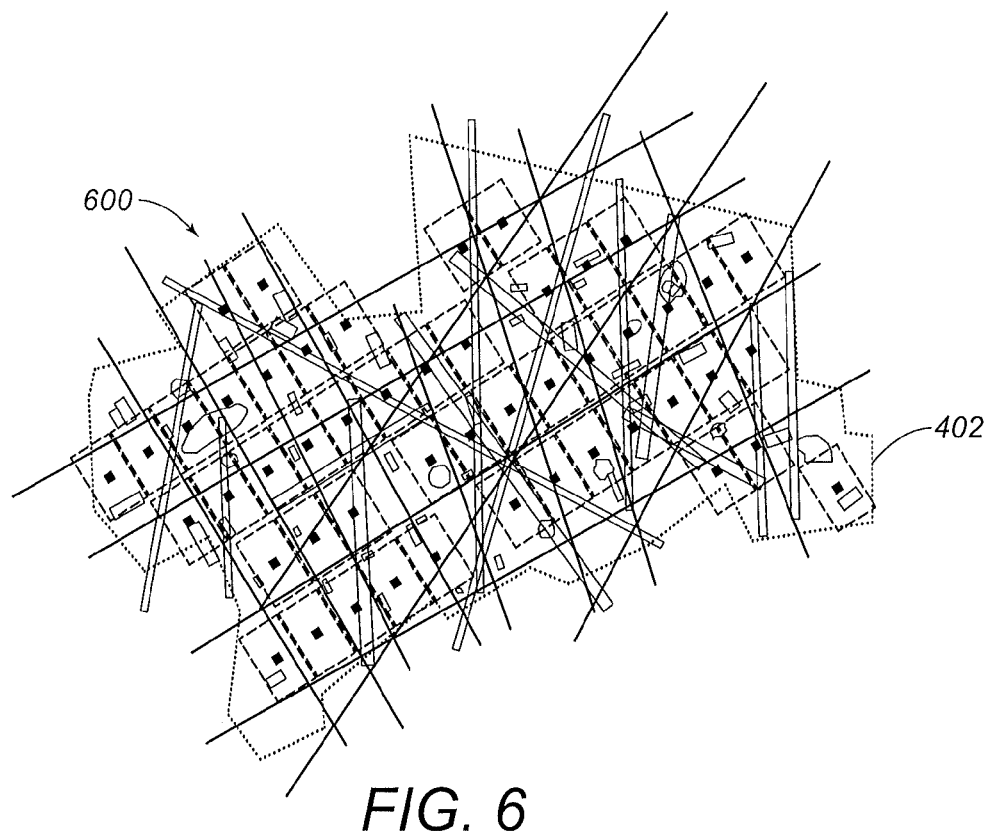
FIG. 6. is a plan view illustrating the predetermined area in FIG. 4 with the same hazards and a row by column pad location pattern based upon an optimized seed point.

Referring now to FIGS. 5-6, the predetermined area in FIG. 4 is illustrated with the same hazards. The plan view 500 in FIG. 5 illustrates the results of the method 100 (without steps 108, 110, 124), which includes a row by column pad location pattern based upon a single random seed point. The plan view 600 in FIG. 6 illustrates the results of the method 100 (without step 124), which includes a row by column pad location pattern based upon an optimized seed point. The pattern in FIG. 6 produced 49 pad locations using an optimized seed point, which is 17 more pad locations than the pattern in FIG. 5 produced using a single random seed point. Each pad location is represented as a solid dark square within a rectangular dashed line representing the coverage area for the horizontal wells to be drilled from the pad location.

Figure 2:
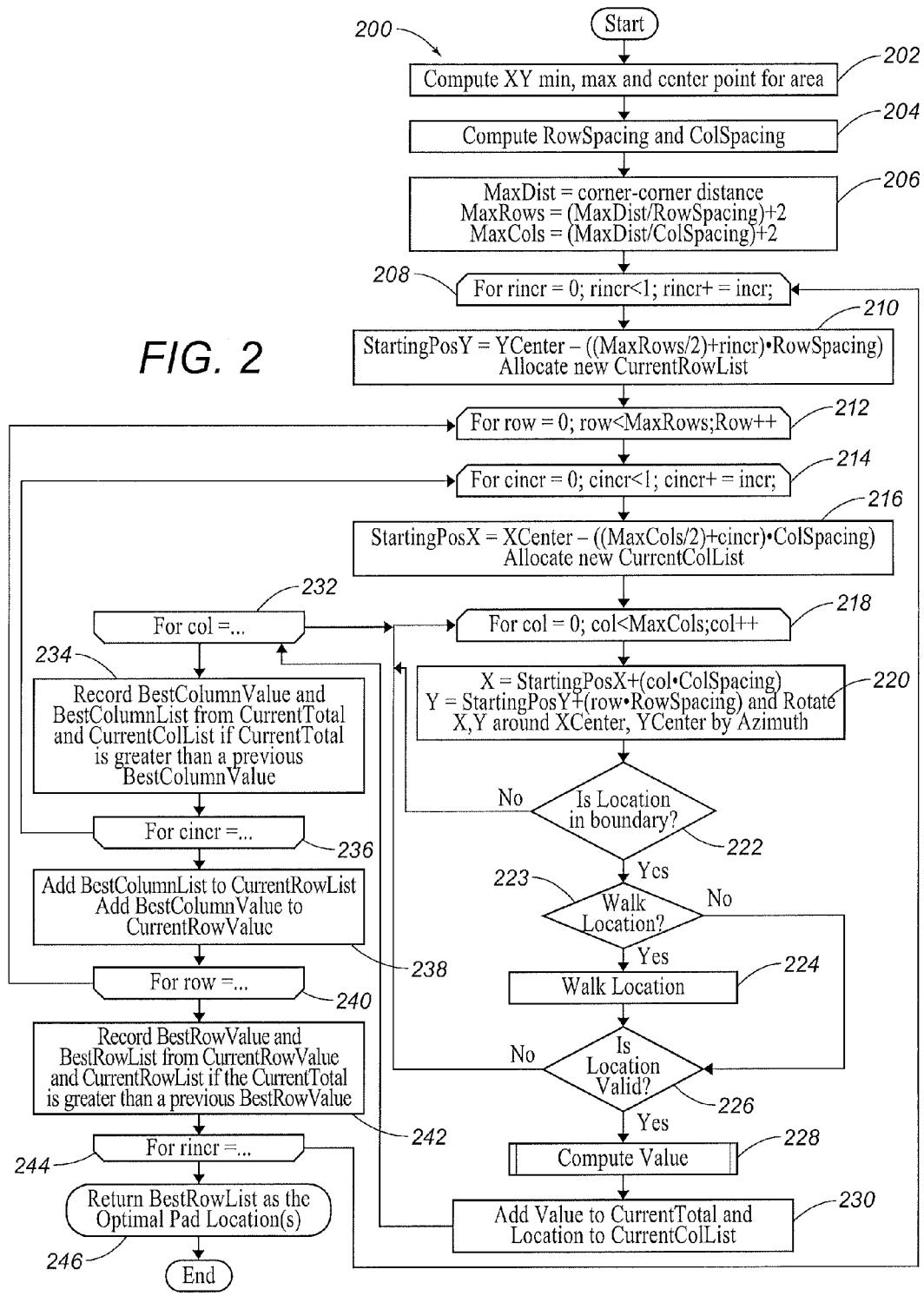
FIG. 2 is a flow diagram illustrating another embodiment of a method for implementing the present invention.

Referring now to FIG. 2, a flow diagram of another embodiment of a method 200 for implementing the present invention is illustrated. The method 200 generally produces a set of pad locations as a set of rows that are roughly equidistantly spaced apart within each row, but without any attempt at columnar alignment with the preceding or subsequent rows.

In step 202, an X Y min, max and a center point are computed for an area representing the anticipated production field using techniques well known in the art. The computed values for (XMin−XMax, YMin−YMax) represent a range that may be used to determine the center point ("XCenter", "YCenter") for the predetermined area by ((XMin+XMax)÷2,(YMin+YMax)÷2)). The range and center point represent the extents of the predetermined area within which all possible pad locations must fall. In other words, this step computes the range (XMin-XMax, YMin−YMax) and center point (XCenter, YCenter) within which all possible pad locations must fall within the predetermined area.

In step 204, a row spacing ("RowSpacing") and column spacing ("ColSpacing") are computed using techniques well known in the art, well dimensions and spacing values. For example, RowSpacing may be computed as the heel/heel spacing plus the toe/toe spacing plus two times the maximum lateral length. ColSpacing may be computed as two times the perpendicular reach to the heel.

In step 206, a maximum distance ("MaxDist"), a maximum number of rows (MaxRows) and a maximum number of columns ("MaxCols") are set equal to: i) corner-corner distance; ii) (MaxDist/RowSpacing)+2; and iii) (MaxDist/ColSpacing)+2, respectively. Corner to corner distance is the distance between the points (XMin, YMin) and (XMax, YMax).

In step 208, a row increment ("rincr") is set to increase between 0 and 1 by a fixed predetermined increment such as, for example, 0.2.

In step 210, a starting position Y (StartingPosY) is set equal to YCenter−((MaxRows/2)+rincr)·RowSpacing) and a new CurrentRowList is started (allocated).

In step 212, a row is set to increase by 1 between 0 and MaxRows.

In step 214, a column increment ("cincr") is set to increase between 0 and 1 by a fixed predetermined increment such as, for example, 0.2.

In step 216, a starting position X (StartingPosX) is set equal to XCenter−((MaxCols/2)+cincr)·ColSpacing) and a new CurrentColList is started (allocated).

In step 218, a column ("col") is set to increase by 1 between 0 and MaxCols.

In step 220, X is set equal to StartingPosX+(col·ColSpacing), Y is set equal to StartingPosY+row·RowSpacing, and X, Y are rotated around XCenter, YCenter by Azimuth. Azimuth represents a predetermined primary drilling azimuth, which is used to rotate X, Y around XCenter, YCenter to a position represented as a new "Location."

In step 222 the method 200 determines if the Location is within a predetermined boundary, which may be represented as a surface boundary including any setbacks. If the Location is not within the predetermined boundary, then the method 200 returns to step 218. If the Location is within the predetermined boundary, then the method 200 proceeds to step 223.

In step 223, the method 200 determines whether to walk the Location based upon whether there are any hazards to avoid such as, for example, predetermined surface and subsurface hazards. If there are no hazards to avoid, then the method 200 proceeds to step 226. If there are hazards to avoid, then the method 200 proceeds to step 224 to walk the Location.

In step 224, the Location is walked using techniques well known in the art such as, for example, the "walk around" techniques described in U.S. Pat. No. 7,200,540. In this manner, a new location may be determined after walking is performed to avoid the hazard(s) or a null location is determined if walking is unable to find a new location within a predetermined maximum allowable movement distance. The more hazards encountered, particularly smaller hazards like roads, pipelines, buildings and the like, the more valuable the walk around becomes.

In step 226, the method 200 determines if the Location from step 220 or step 224 is valid using techniques well known in the art. For example, a valid Location may be one that is both within the predetermined boundary and free of hazards. A valid Location based upon this criteria therefore, may be determined by comparing the Location to one or more two-dimensional polygons, comparing them by color, to a geo-referenced image with known good/bad coloring, determining value and/or slope from a grid, etc. If the Location is not valid, then the method 200 proceeds to step 218. If the Location from step 224 is null, then the Location is invalid for purposes of this step. If the Location is valid, then the method 200 proceeds to step 228.

In step 228, the "Compute Value" algorithm is executed to compute a Value, which is described further in reference to FIG. 3.

In step 230, the Value is added to CurrentTotal and the Location from step 220 or step 224 is added to CurrentColList. The CurrentTotal is a running total of the Values for the CurrentColList.

In step 232, the method 200 returns to step 218 if col is less than MaxCols and col is set to the next increment. If col is equal to MaxCols, then the method 200 proceeds to step 234.

In step 234, BestColumnValue and BestColumnList are recorded from (i.e. set equal to) CurrentTotal and CurrentColList, respectively, if the CurrentTotal is greater than a previous BestColumnValue. Thus, the BestColumnValue and BestColumnList would be initialized to 0 and empty, respectively, between steps 212 and 214. The BestColumnList and the CurrentColList represent actual locations for the pad(s) and the BestColumnValue and the CurrentTotal represent the summation of Values for the respective locations.

In step 236, the method 200 returns to step 214 if cincr is less than 1 and cincr is set to the next increment. If cincr is equal to 1, then the method 200 proceeds to step 238.

In step 238, BestColumnList is added to CurrentRowList and BestColumnValue is added to CurrentRowValue, which is 0 during the first iteration of step 238.

In step 240, the method 200 returns to step 212 if row is less than MaxRows and row is set to the next increment. If row is equal to MaxRows, then the method 200 proceeds to step 242.

In step 242, BestRowValue and BestRowList are recorded from (i.e. set equal to) CurrentRowValue and CurrentRowList, respectively, if the CurrentTotal is greater than a previous BestRowValue. Thus, the BestRowValue and BestRowList would be initialized to 0 and empty, respectively, between steps 212 and 214. The BestRowList and the CurrentRowList represent actual locations for the pad(s) and the BestRowValue and the CurrentRowValue represent the summation of Values for the respective locations.

In step 244, the method 200 returns to step 208 if rincr is less than 1 and rincr is set to the next increment. If rincr is equal to 1, then the method 200 proceeds to step 246.

In step 246, BestRowList is returned as the optimal pad location(s) and the method 200 ends.

Figure 7:
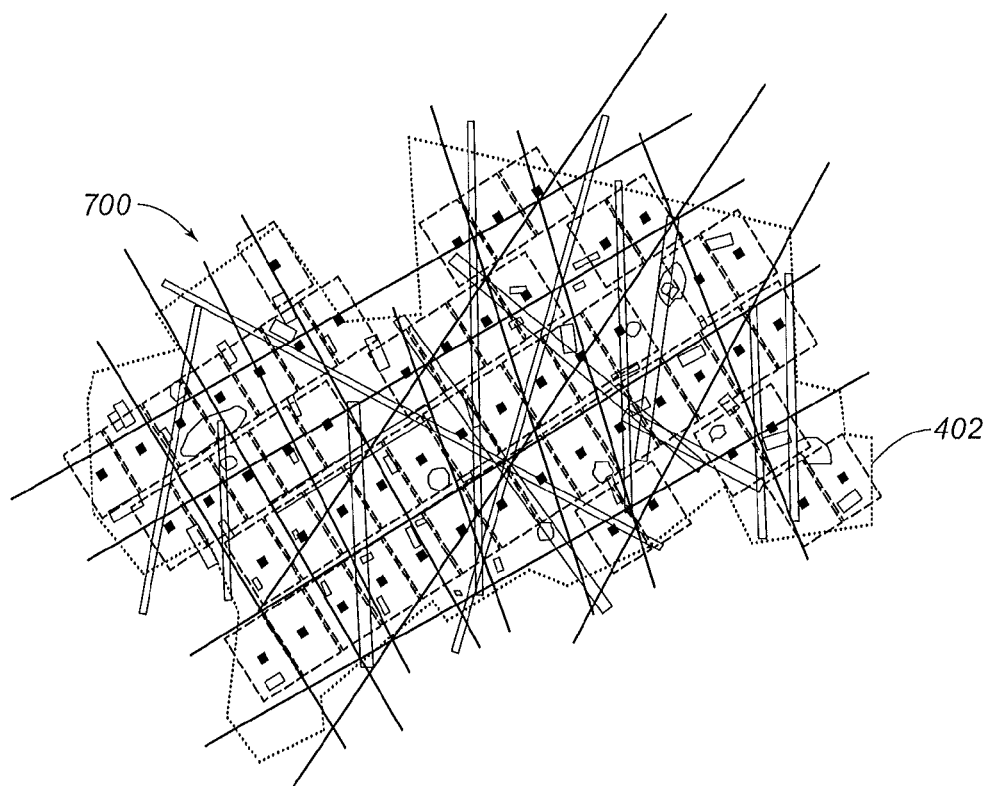
FIG. 7. is a plan view illustrating the predetermined area in FIG. 4 with the same hazards and an optimal pad location pattern.
Figure 8:
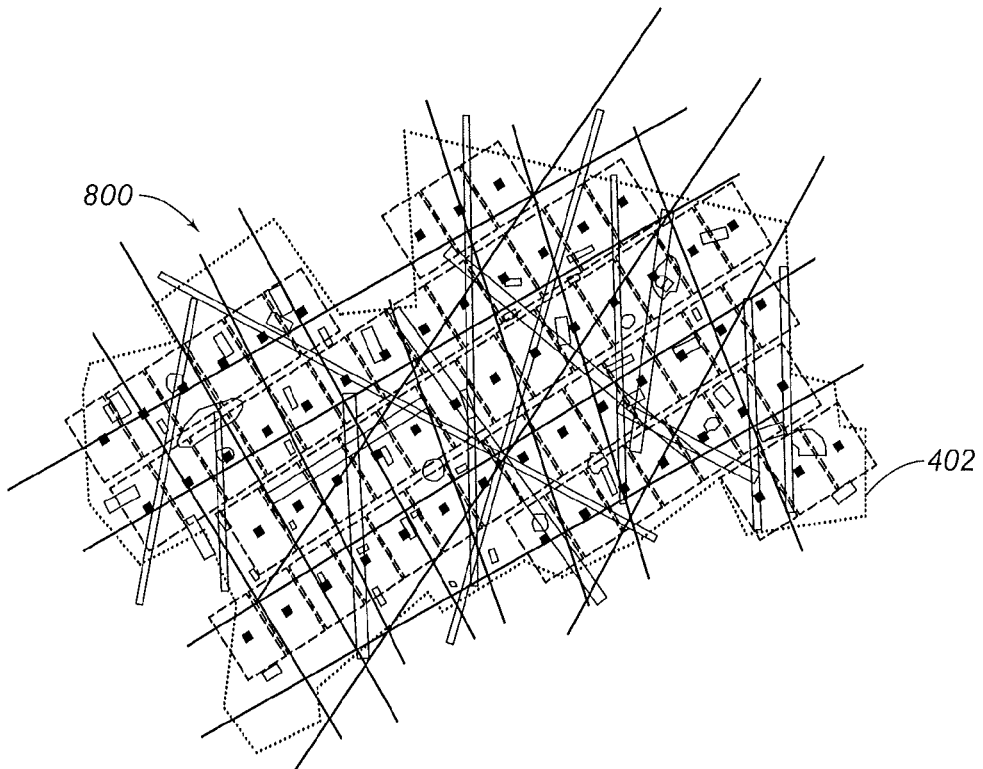
FIG. 8. is a plan view illustrating the predetermined area in FIG. 4 with the same hazards and another optimal pad location pattern obtained by walking the pad locations around to avoid the hazards.

Referring now to FIGS. 7-8, the predetermined area in FIG. 4 is illustrated with the same hazards. The plan view 700 in FIG. 7 illustrates the results of the method 200 (without step 224), which includes an optimal pad location pattern. The plan view 800 in FIG. 8 illustrates the results of the method 200, which includes another optimal pad location pattern obtained by walking the pad locations around to avoid the hazards. The pattern in FIG. 8 produced 59 pad locations by walking the location in step 224, which is 4 more pad locations than the pattern in FIG. 7 produced without walking the location in step 224. Each pad location is represented as a solid dark square within a rectangular dashed line representing the coverage area for the horizontal wells to be drilled from the pad location.

Referring now to FIG. 3, a flow diagram of one embodiment of the "Compute Value" algorithm for performing steps 128 and 228 in FIGS. 1 and 2, respectively, is illustrated. The method 300 computes a value for the pad location based upon how the area around it could be drained by horizontal wells drilled from that pad location using current design constraints. Other techniques well known in the art, however, may be used to assign a value to the pad location.

In step 304, eight predetermined locations are adjusted for the Location from step 120 or step 224 and Value is set equal to 0. The 8 predetermined locations comprise 4 locations at the maximum distances in each direction along the primary drilling azimuth from a (0, 0) pad location and four locations at the minimum distances in each direction along the primary drilling azimuth from a (0, 0) pad location. The maximum distance assumes that a lateral has a heel at the maximum reach value and the lateral length is a maximum lateral length. The minimum distance assumes that a lateral has a heel at half the maximum reach value and the lateral length is a minimum lateral length. These 8 predetermined locations maybe adjusted by shifting each location from a (0, 0) pad location to the proposed pad location by adding the Location form step 120 or step 224 to each predetermined location.

In step 306, the method 300 selects an adjusted location for steps 308-310. The method 300 may select the adjusted location at random or using any other predetermined criteria.

In step 308, the method 300 determines if the adjusted location is in a valid targeting position. A valid targeting position, for example, may be one that is within surface and subsurface boundaries and free of any hazards. If the adjusted location is not in a valid targeting position, then the method 300 returns to step 306. If the adjusted location is in a valid targeting position, then the method 300 proceeds to step 310.

In step 310, Value is set equal to Value +0.1. A value of 0.1 is added for each adjusted location that is in a valid targeting position and, if all eight adjusted locations are in a valid targeting position, the Value in step 316 is set to 1.0 in order to reflect that one pad that is 100% effective is more valuable than two pads that are each 50% effective.

In step 312, the method 300 determines if additional adjusted locations are available from step 304. If there are additional adjusted locations, then the method 300 returns to step 306 to select another adjusted location. If there are no additional adjusted locations, then the method 300 proceeds to step 314.

In step 314, the method 300 determines if the cumulative Value from step 310 is greater than 0.75. If Value is not greater than 0.75, then the method 300 proceeds to step 318. If Value is greater than 0.75, then the method 300 proceeds to step 316.

In step 316, Value is set equal to the cumulative Value from step 310 +0.2.

In step 318, MoveDivisor is set equal to Max(RowSpacing, ColSpacing). In other words, the MoveDivisor is set equal to the greater of RowSpacing and ColSpacing.

In step 320, Value is set equal to Value−(MoveDistance/MoveDivisor) where MoveDistance is the distance that the Location was moved in step 124 or step 224.

In step 322, the method 300 determines if Value is less than MinimumValue. If Value is not less than MinimumValue, then the method 300 proceeds to step 326. If Value is less than MinimumValue, then the method 300 proceeds to step 324. MinimumValue is a predetermined value so that if the pad location does not meet this value, it should not be included in the field plan.

In step 324, Value is set equal to 0.

In step 326, Value from step 320 or step 324 is returned to step 128 or step 228.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. AssetPlanner and/or TracPlanner™, which are commercial software applications marketed by Landmark Graphics Corporation, may be used as interface applications to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 9:
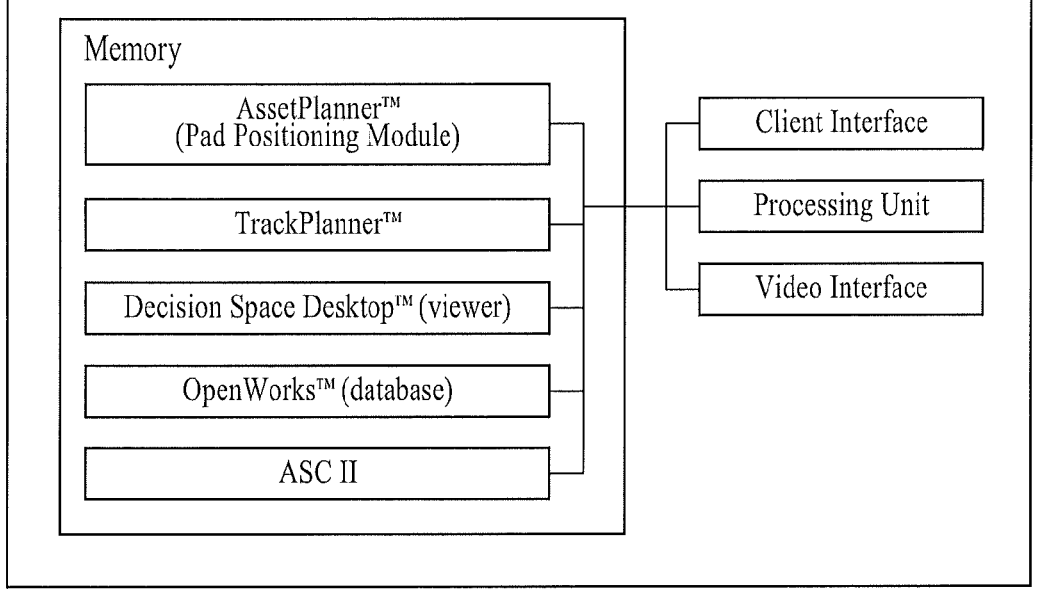
FIG. 9 is a block diagram illustrating one embodiment of a computer system for implementing the present invention.

Referring now to FIG. 9, a block diagram of a system for implementing the present invention on a computer is illustrated. The system includes a computing unit, sometimes referred to as a computing system, which contains memory, application programs, a database, a viewer, ASCII files, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-8. The memory therefore, includes OpenWorks™, which may be used as a database to supply data and/or store data results. ASCII files may also be used to supply data and/or store the data results. The memory also includes DecisionSpaceDesktop™, which may be used as a viewer to display the data and data results. The pad positioning module in Asset Planner™ may be used to interface with TracPlanner™ for determining the optimal position of each pad. Although AssetPlanner™ may be used with TracPlanner™ to determine the optimal position of each pad, other interface applications may be used, instead, or the pad positioning module may be used as a stand-alone application. DecisionSpaceDesktop™ and OpenWorks™ are commercial software applications marketed by Landmark Graphics Corporation.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention to those embodiments. Because the systems and methods described herein may be used to selectively and automatically position various platform types, they may be particularly useful for positioning drilling pads for cell phone towers, electrical lines, homes, oil and gas rigs and the like. It is therefore, contemplated that various alternative embodiments and modifications may be made to the disclosed embodiments without departing from the spirit and scope of the invention defined by the appended claims and equivalents thereof.

The invention claimed is:

1. A method for positioning multiple drilling pads within a predetermined boundary, which comprises:

a) determining a maximum number of rows based on a row spacing and a maximum distance;
   b) determining a maximum number of columns based on a column spacing and the maximum distance;
   c) determining a seed point location within the predetermined boundary for each row at a starting position and for each column at a starting position, each seed point location belonging to a set of seed point locations;
   d) computing a total value for the set of seed point locations using a computer processor;
   e) adjusting the starting position in each row by a row increment and the starting position in each column by a column increment;
   f) repeating steps c)-e) for a predetermined number of starting positions in each row and a predetermined number of starting positions in each column; and
   g) positioning a drilling pad at each location based on a respective seed point location within the set of seed point locations having a best total value.

2. The method of claim 1, wherein each seed point location is represented by x, y coordinates.

3. The method of claim 2, further comprising computing a value for each seed point location within the set of seed point locations.

4. The method of claim 3, wherein the total value for the set of seed point locations is represented by a sum of the values for each seed point location at each respective x, y coordinates.

5. The method of claim 3, wherein the total value for the set of seed point locations is represented by a sum of the values for each seed point location at each respective y coordinate for each row and each column and at each respective x coordinate for each row.

6. The method of claim 2, wherein the highest total value for the set of seed point locations is represented by the highest total value for the set of seed point locations with the same x, y coordinates for each row and for each column.

7. The method of claim 2, wherein the highest total value for the set of seed point locations is represented by the highest total value for the set of seed point locations at the same y coordinate for each row and a different x coordinate for each row.

8. The method of claim 1, further comprising walking each seed point location within the predetermined boundary to avoid any hazards.

9. The method of claim 1, further comprising confirming that each seed point location within the predetermined boundary is clear of any hazards.

10. The method of claim 1, further comprising initializing a row and a row increment and initializing a column and a column increment.

11. A program carrier device for carrying computer executable instructions for positioning multiple drilling pads within a predetermined boundary, the instructions being executable to implement:

a) determining a maximum number of rows based on a row spacing and a maximum distance;
   b) determining a maximum number of columns based on a column spacing and the maximum distance;
   c) determining a seed point location within the predetermined boundary for each row at a starting position and for each column at a starting position, each seed point location belonging to a set of seed point locations;
   d) computing a total value for the set of seed point locations;

e) adjusting the starting position in each row by a row increment and the starting position in each column by a column increment;

f) repeating steps c)-e) for a predetermined number of starting positions in each row and a predetermined number of starting positions in each column; and g) positioning a drilling pad at each location based on a respective seed point location within the set of seed point locations having a best total value.

12. The method of claim 11, wherein each seed point location is represented by x, y coordinates.

13. The method of claim 12, further comprising computing a value for each seed point location within the set of seed point locations.

14. The method of claim 13, wherein the total value for the set of seed point locations is represented by a sum of the values for each seed point location each respective x, y coordinates.

15. The method of claim 13, wherein the total value for the set of seed point locations is represented by a sum of the values for each seed point location at each respective y coordinate for each row and each column and at each respective x coordinate for each row.

16. The method of claim 12, wherein the highest total value for the set of seed point locations is represented by the highest total value for the set of seed point locations with the same x, y coordinates for each row and for each column.

17. The method of claim 12, wherein the highest total value for the set of seed point locations is represented by the highest total value for the set of seed point locations at the same y coordinate for each row and a different x coordinate for each row.

18. The method of claim 11, further comprising walking each seed point location within the predetermined boundary to avoid any hazards.

19. The method of claim 11, further comprising confirming that each seed point location within the predetermined boundary clear of any hazards.

20. The method of claim 11, further comprising initializing a row and a row increment and initializing a column and a column increment.

* * * * *